(12) United States Patent
Llewellyn et al.

(10) Patent No.: US 11,698,070 B2
(45) Date of Patent: Jul. 11, 2023

(54) GROUTING MATERIAL DELIVERY AND APPLICATION SYSTEM

(71) Applicant: Recyca-Pipe of America L.L.C., Detroit, MI (US)

(72) Inventors: Clinton Edward Llewellyn, Waterford, MI (US); Alfred G. Hering, Southport, NC (US); John Harry Camp, New Smyrna Beach, FL (US)

(73) Assignee: Recyca-Pipe of America L.L.C., Detroit, MI (US)

( * ) Notice: Subject to any disclaimer, the term of this patent is extended or adjusted under 35 U.S.C. 154(b) by 0 days.

(21) Appl. No.: 17/588,782

(22) Filed: Jan. 31, 2022

(65) Prior Publication Data
US 2022/0154717 A1 May 19, 2022

Related U.S. Application Data

(62) Division of application No. 15/925,031, filed on Mar. 19, 2018, now abandoned.
(Continued)

(51) Int. Cl.
*F16L 55/1645* (2006.01)
*F16L 55/165* (2006.01)
(Continued)

(52) U.S. Cl.
CPC .............. *F04C 14/08* (2013.01); *B05C 3/172* (2013.01); *B05D 7/222* (2013.01); *B05D 7/225* (2013.01);
(Continued)

(58) Field of Classification Search
CPC . B05C 3/12–172; B05C 5/0245; B05C 5/025; F16L 55/16455–1652; F16L 55/1655
See application file for complete search history.

(56) References Cited

U.S. PATENT DOCUMENTS

| 1,498,738 | A |   | 6/1924 | Lahousse |
| 3,840,384 | A | * | 10/1974 | Reade ............... B05D 7/02 |
|           |   |   |         | 427/172 |

(Continued)

FOREIGN PATENT DOCUMENTS

| CN | 201386244 Y | 1/2010 |
| CN | 103276736 B | 1/2016 |

(Continued)

OTHER PUBLICATIONS

International Search Report and Written Opinion dated Jun. 12, 2018 for International Application No. PCT/US2018/023217, 11 pages.

*Primary Examiner* — Yewebdar T Tadesse
*Assistant Examiner* — Stephen A Kitt
(74) *Attorney, Agent, or Firm* — Dickinson Wright PLLC

(57) ABSTRACT

A grouting material delivery and application system for coating the exterior of a collapsed liner with an even distribution of grouting material prior to insertion into a damaged conduit. The apparatus includes a wetout funnel for receiving grouting material to evenly coat the exterior of the liner. The wetout funnel includes opposite walls forming a v-shape with a slot at the bottom of the v-shape and a squeegee disposed at the slot for controlling the coating of grouting material for a uniform covering on the liner as it passes through the wetout funnel. A first ejector pipe having an inflow end and an outflow end for receiving and dispensing grouting material to coat one half of the exterior of the liner. A second ejector pipe having an inflow end and an outflow end for receiving and dispensing grouting material to coat the opposite half of the exterior of the liner.

1 Claim, 9 Drawing Sheets

Related U.S. Application Data

(60) Provisional application No. 62/473,631, filed on Mar. 20, 2017.

(51) Int. Cl.
*F16L 55/18* (2006.01)
*B05C 3/172* (2006.01)
*F16L 101/30* (2006.01)
*F04C 14/08* (2006.01)
*B05D 7/22* (2006.01)

(52) U.S. Cl.
CPC ..... *F16L 55/1654* (2013.01); *F16L 55/16455* (2013.01); *F16L 55/18* (2013.01); *F16L 2101/30* (2013.01)

(56) References Cited

U.S. PATENT DOCUMENTS

| | | |
|---|---|---|
| 3,930,464 A * | 1/1976 | Wallsten ............... B05C 5/0245 |
| | | 118/316 |
| 4,347,018 A | 8/1982 | Wrightson et al. |
| 4,740,110 A | 4/1988 | Saffrhan |
| 5,139,751 A | 8/1992 | Mansfield et al. |
| 5,314,100 A | 5/1994 | Deaver |
| 5,351,720 A | 10/1994 | Maimets |
| 5,762,450 A | 6/1998 | Schmager |
| 5,791,378 A | 8/1998 | Stephens |
| 5,829,605 A | 11/1998 | Poitras |
| 5,993,114 A | 11/1999 | Jones |
| 6,167,913 B1 | 1/2001 | Wood et al. |
| 7,025,580 B2 | 4/2006 | Heagy et al. |
| 7,407,197 B2 | 8/2008 | Gronquist |
| 7,942,167 B1 * | 5/2011 | Llewellyn ............. F16L 55/165 |
| | | 264/269 |
| 8,864,417 B2 | 10/2014 | Tkaczyk et al. |
| 9,435,480 B2 | 9/2016 | Higman |
| 9,724,872 B2 | 8/2017 | Kiest, Jr. |
| 2006/0197262 A1 * | 9/2006 | Waring .................. B29C 63/36 |
| | | 264/516 |
| 2008/0047624 A1 * | 2/2008 | Iwasaki-Higbee .... F16L 55/164 |
| | | 264/269 |
| 2010/0212803 A1 | 8/2010 | Carr et al. |
| 2010/0215859 A1 | 8/2010 | Alexander |
| 2016/0258566 A1 * | 9/2016 | Waring .................. F16L 55/18 |
| 2017/0219155 A1 | 8/2017 | Llewellyn et al. |

FOREIGN PATENT DOCUMENTS

| | | |
|---|---|---|
| CN | 106351447 A | 1/2017 |
| WO | 8703840 A1 | 7/1987 |
| WO | 9205944 A1 | 4/1992 |
| WO | 2016005851 A1 | 1/2016 |
| WO | 2017136299 A1 | 8/2017 |

* cited by examiner

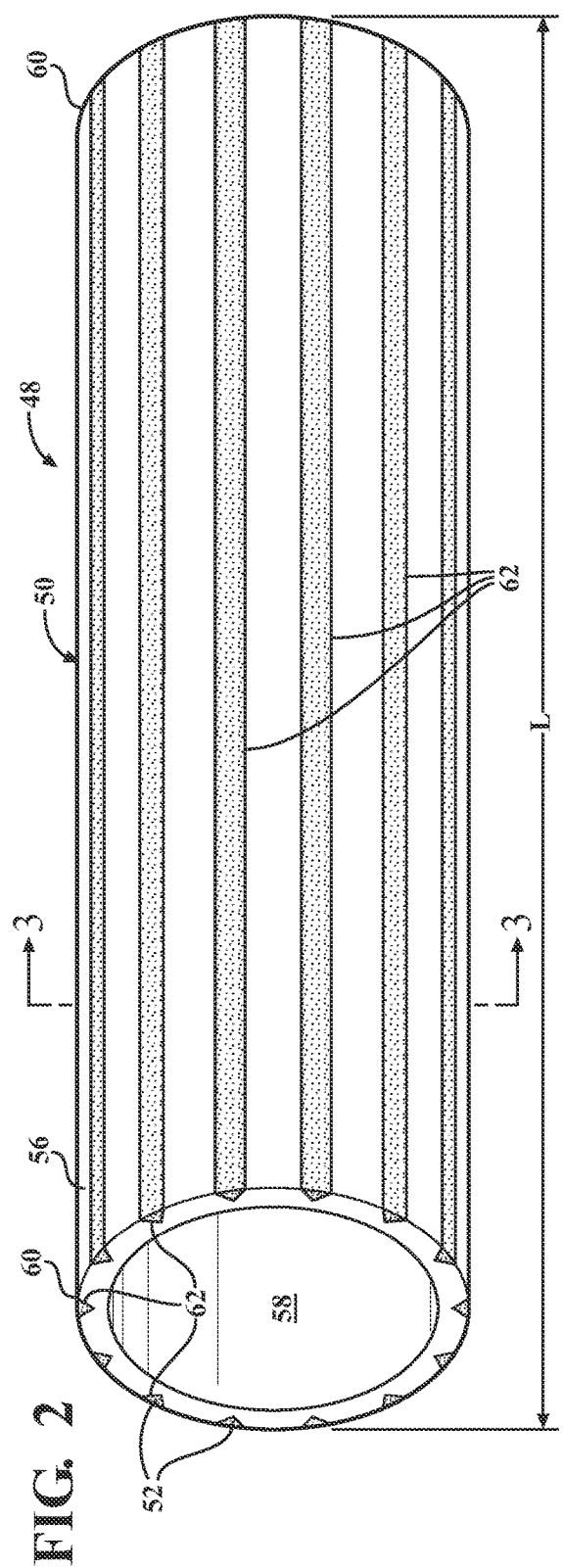
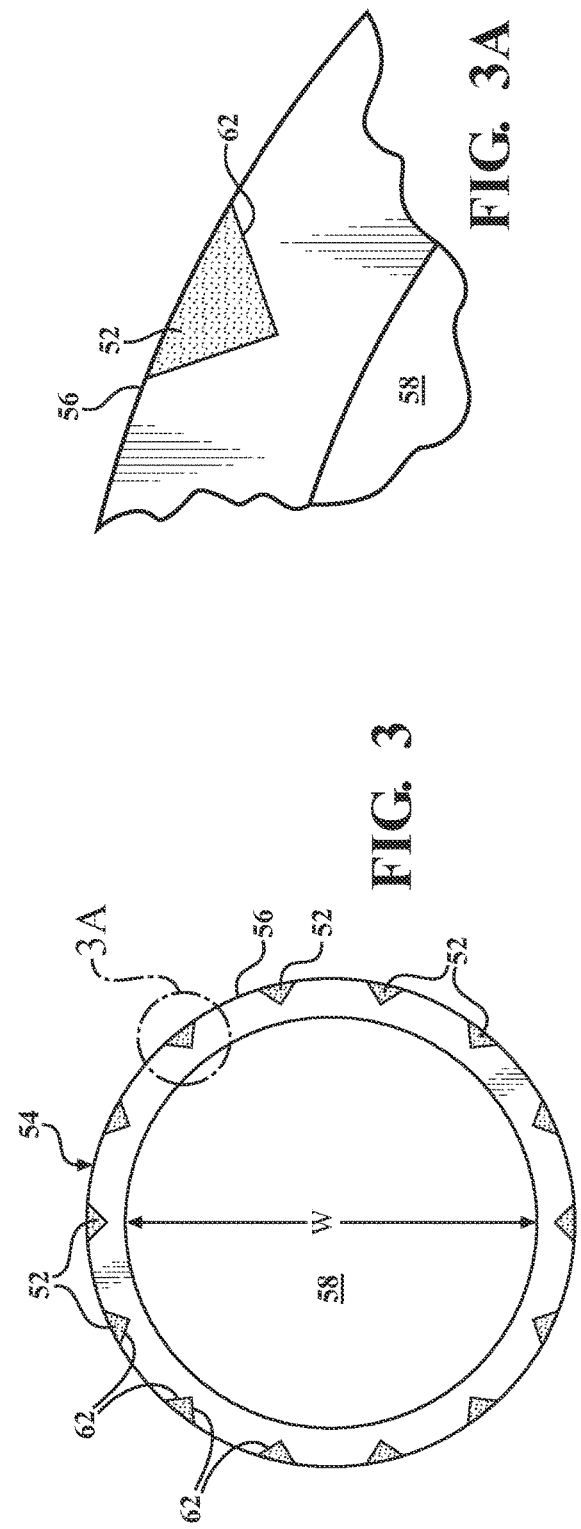

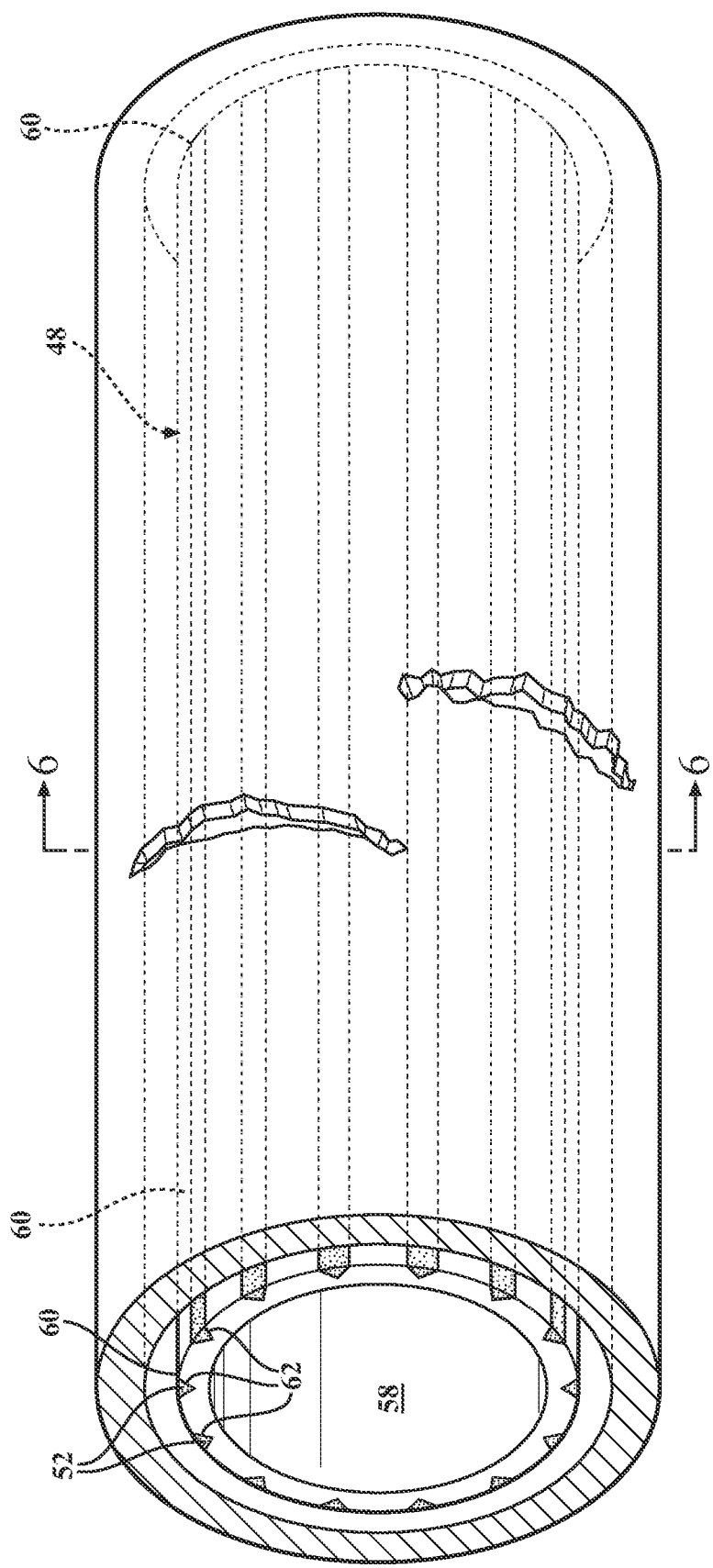

GROUTING MATERIAL DELIVERY AND APPLICATION SYSTEM

CROSS REFERENCE TO RELATED APPLICATION

This U.S. divisional patent applications claims the benefit of U.S. application Ser. No. 15/925,031, filed Mar. 19, 2018, which claims the benefit of U.S. provisional patent application No. 62/473,631 filed Mar. 20, 2017.

BACKGROUND OF THE INVENTION

1. Field of the Invention

The present invention relates to a mobile grouting delivery and applicator system for evenly applying an adhesive grouting material to an expandable flexible liner during the repair of an underground conduit.

2. Description of the Prior Art

Such grouting material delivery and application systems are well known. One such grouting material delivery system, disclosed in U.S. Pat. No. 5,139,751 to William Mansfield et al., includes a trailer having a base and reel of hose, a power source, a grouting material storage tank, and pump to pump the grouting material through the hose for treating the interior of a conduit.

Another such grouting material delivery and application system is disclosed in U.S. Pat. No. 5,314,100 granted May 24, 1994 to Jim Deaver includes a trailer with a power supply containing a grouting material storage hopper connected to a motor-operated pump and having a flexible hose where the grouting material flow can be adjusted by a discharge nozzle.

Alternatively, a grouting material delivery and application system is disclosed in U.S. Pat. No. 4,740,110 granted Apr. 26, 1988 to Ray Saffrhan and includes a barge for traveling over the water having a power supply, pump and tank for grouting material storage with a winch and/or crane for lifting and lower grouting material hose into and out of the water.

Conventionally, once at the repair site, the liner is pulled through the conduit with a winch. Once the liner is in place, the grouting material is then pumped into the conduit between the damaged conduit interior surface and the exterior surface of the liner. Another common method is to pump the grouting material into the conduit and then pull the liner through the grouting material-filled conduit. One such assembly, disclosed in U.S. Pat. No. 6,167,913 granted Jan. 2, 2001 to Peter Wood et al., discloses a method of repairing a conduit by pulling a flattened tubular liner with grouting material anchor hooks, for collecting grouting material when applied, through the conduit from one manhole to another using a winch. The conduit is precharged with grouting material and once the liner is pressurized and inflated, the grouting material flows between the outer surface of the liner attaching to the anchor hooks and the inner surface of the conduit. This method leaves open the possibility of not having a uniform coating on the liner which could lead to voids in the coverage of the grouting material and weak spots of the conduit after curing. Similarly, both U.S. Pat. Nos. 5,762,450 and 5,791,378, also discuss pulling a liner through the conduit and pumping grouting material in the annular space between the liner and conduit for repair of the conduit.

Alternatively, U.S. Pat. No. 5,993,114 granted Nov. 30, 1999 to Gerald Jones, discloses an apparatus and method of repairing a conduit by providing a tubular liner having a first surface facing inwardly of the liner and a second surface facing outwardly of the liner and where a grouting material is disposed on the first surface, inverting the liner adjacent one end of the liner and moving a portion of the liner along the length of the pipe to progressively cause the first surface to face outwardly of the liner and to come into direct contact with the inner surface of the pipe without contacting any other material so that the coating comprises the only material between the pipe and the liner.

Alternatively, U.S. Patent Application Publication 2010/0212803 published Aug. 26, 2010 to Heath Car et al., discloses a method of reinforcing a conduit with fiber reinforced polymer including coating a raw carbon fiber material with an epoxy resin by directing the fiber material stored on a reel into a dipping tank and through rollers acting as squeegees and finally applied to the walls of a conduit.

Also, U.S. Patent Application Publication 2010/0215859 published Feb. 20, 2010 to David Lee Alexander, discloses a dip-coating system for applying a liquid coating material onto building materials such as lumber. The system comprises a funnel box containing a dipping slot and dipping sleeve to hold the liquid coating material and end pieces that are adjustable for varying sizes of lumber. Brushes are attached to the funnel box to act as squeegees for wiping off excess coating material.

Finally, U.S. Pat. No. 1,498,738 published Jun. 24, 1924 to Joseph Lahousse discloses an apparatus and method for coating wires. The wire stored on a reel is pulled through a liquefied coating followed by a gauge tube for regulating the thickness of the coating on the wire.

SUMMARY OF THE INVENTION

In view of the foregoing state of the art, the object of the invention is to provide an apparatus of the type for coating the exterior of a collapsed liner with an even distribution of a grouting material. The apparatus includes a wetout funnel for receiving grouting material to evenly coat the entire outside diameter of the liner. The wetout funnel includes opposite walls forming a v-shape with a slot at the bottom of the v-shape and a squeegee disposed at the slot for controlling the coating of grouting material for a uniform covering on the liner as it passes through the wetout funnel. A first ejector pipe having an inflow end and an outflow end for receiving and dispensing grouting material to coat one half of the liner exterior. A second ejector pipe having an inflow end and an outflow end for receiving and dispensing grouting material to coat the opposite half of the liner exterior. The shape of the wetout funnel and the positioning of the ejector pipes provides for even distribution of the grouting material onto the liner so that when the liner is pulled through the conduit, the grouting material fills cracks and holes in the conduit inner walls.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of a first embodiment of an expandable pipe system;

FIG. 3 is a cross sectional view of the expandable pipe system of FIG. 2 along line 3-3 showing grooves having a curved profile;

FIG. 3A is an enlarged view of a groove of FIG. 3;

FIG. 4 is a perspective view of the expandable pipe system of FIG. 1 disposed in a conduit including cracks in the host conduit;

DESCRIPTION OF THE ENABLING EMBODIMENT

Figure 1:
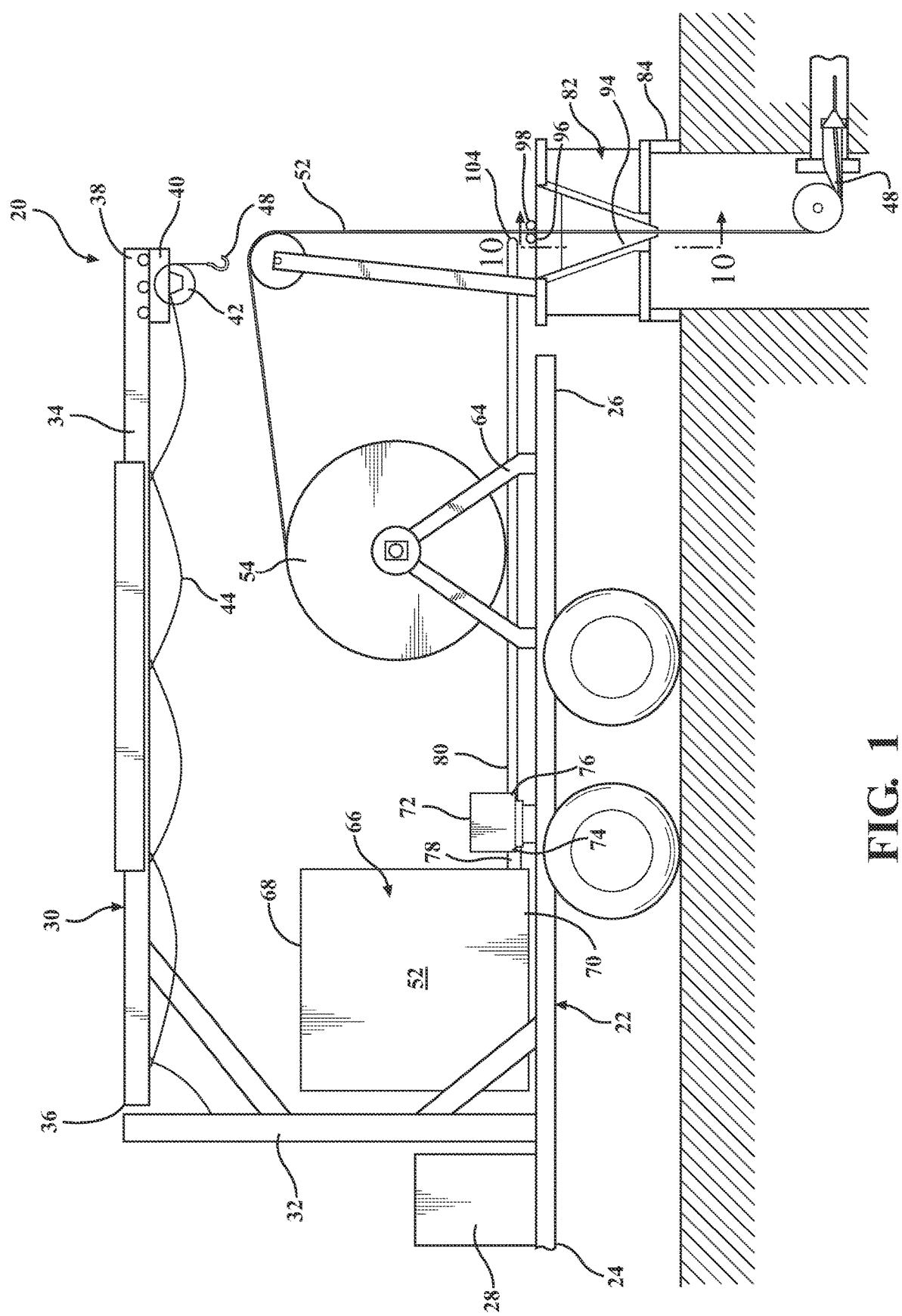
FIG. 1 is a side elevational view of the grouting material delivery and application system with a cut-away at the wetout funnel to show a liner being pulled through the grouting material.

Referring to the Figures, wherein like numerals indicate corresponding parts throughout the several views, an apparatus 20, generally shown in FIG. 1, is a mobile grouting system used for repairing a damaged conduit. According to the present invention the apparatus 20 includes a support 22, trailer, extending along an axis between a first end 24 and a second end 26 with two or more road wheels spaced from one another transversely of the axis and carrying the support 22. The apparatus 20 can be self-contained on the support 22 which can be attached to a transport vehicle, such as a truck or tractor, using a hitch to be conveniently towed to and from a conduit repair location. The apparatus 20 can also be three integrated units with each unit either on the support 22 or placed on the ground during the repair of the conduit. Alternatively, the support 22 could be a barge or boat for traveling over the water to repair damaged conduits under the water.

A power supply 28 and/or an air compressor and/or blower is mounted on the first end 24 of the support 22 for supplying electrical power to the equipment of the apparatus 20 and inflation air for the liner placement. The power supply 28 and/or air compressor could also be used to supply electrical energy to operate any electrically based or pneumatic power tools and equipment used during the repair of the underground conduit. The power supply 28 can include, but is not limited to generators, batteries, inverters, etc.

A crane assembly 30 is mounted adjacent to the power supply 28 on the support 22. The crane assembly 30 is connected to the power supply 28 for hoisting movable equipment and tools onto and off of the support 22 and for lowering of the equipment and tools down into a manhole.

The crane assembly 30 includes a mast 32 extending vertically from the support 22 and a boom 34 mounted and cantilevered to the mast 32 and extending from a near end 36 adjacent the mast 32 to a far end 38. The crane assembly 30 also includes a trolley 40 movably supported by the boom 34 for moving back and forth on the boom 34. A pulley 42 is supported by the trolley 40 along with a cable 44 extending along the length of the boom 34 that loops through the pulley 42 to a hook 46 on the end of the cable 44 for lifting and lowering of the equipment and tools.

As shown in FIG. 2, an expandable pipe system 48 includes a liner 50 and a grouting material 52 where the grouting material 52 is applied to the liner 50. The expandable pipe system 48 is inserted into a damaged conduit, as shown in FIG. 4, and allowed to expand and adhere to the host conduit in a manner that eliminates void spaces, cracks, and holes, and increases the structural integrity of the conduit.

The liner 50 is brought to the repair location loaded on to the support 22. As shown in FIG. 1, the liner 50, flexible and made of a polymer material, such as thermoplastic polyurethane (TPU) or a recycled polypropylene (PP), is coiled, lying flat like a firehose, stored onto a reel 54 located on the support 22. As shown in FIG. 2, the liner 50 has an exterior surface 56 surrounding a center opening 58 and extending between opposite liner ends 60. The exterior surface 56 of the liner 50 has a liner width W, shown in FIGS. 2 and 3, extending across its center opening 58 and a liner length L extending along the center opening 58. The exterior surface 56 defines a plurality of grooves 62 spaced from one another for containing the grouting material 52 in the grooves 62 prior to insertion into the conduit. The plurality of grooves 62 can be formed by cutting or stamping into the exterior surface 56 of the liner 50, or by other methods known in the art. Each of the grooves 62 extend radially into the exterior surface 56 to a depth as shown in FIGS. 3 and 3A. The grooves 62 are typically spaced an equal distance from one another around or along the liner 50. As shown in the FIGS. 2-7, the grooves 62 only extend partially through the liner 50 so that the inside of the liner 50 presents a continuous smooth and sealed surface. In other words, the liner 50 is free of holes.

Figure 8:
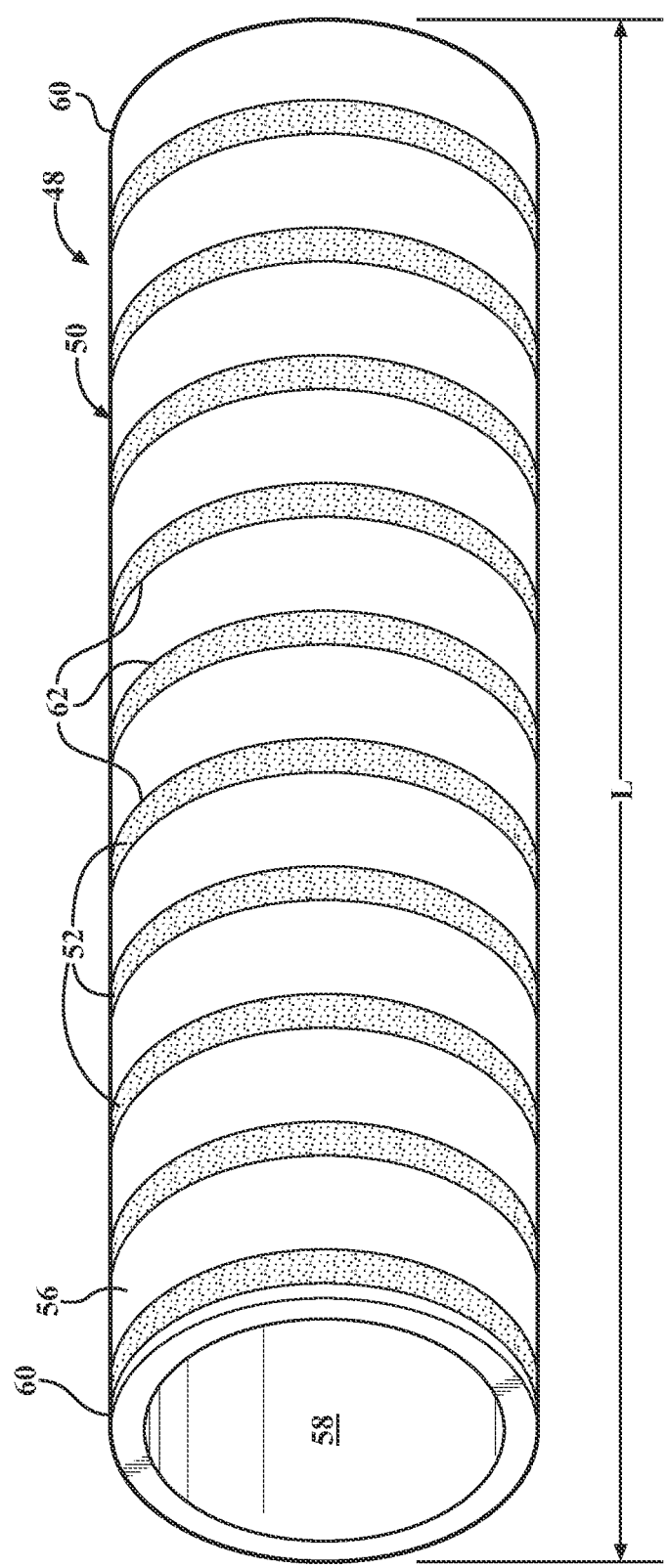
FIG. 8 is a perspective view of a second embodiment of the expandable pipe including grooves extending circumferentially around a center opening.
Figure 9:
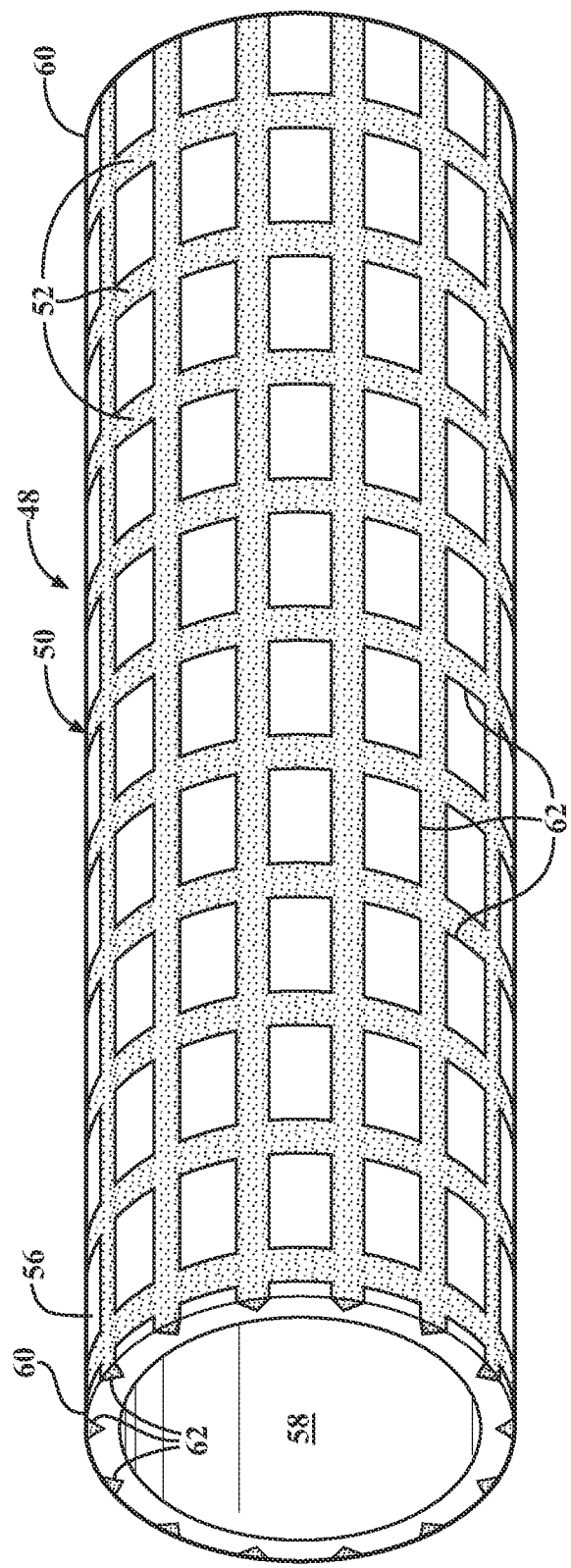
FIG. 9 is a perspective view of a third embodiment of the expandable pipe system including grooves extending circumferentially around a center opening and longitudinally between ends.

In one embodiment, each of the grooves 62 extends longitudinally between the ends along the exterior surface 56, as shown in FIG. 2. In another embodiment, each of the grooves 62 extend circumferentially around the center opening 58 along the exterior surface 56, as shown in FIG. 8. In yet another embodiment, the grooves 62 extend both circumferentially around the center opening 58, and longitudinally between the ends along the exterior surface 56, as shown in FIG. 9. The grooves 62 are typically spaced an equal distance from one another around or along the length of the liner 50. Alternatively, the grooves 62 can be formed in only certain sections of the liner 50 so that the grouting material 52 material is only disposed in those sections. The grouting material 52 is disposed in the grooves 62 and flush with the exterior surface 56 of the liner 50 so that the grouting material 52 does not escape the grooves 62 as the liner 50 brushes against the conduit when the liner 50 slides into the conduit. The plurality of grooves 62 also make the liner 50 more flexible and easier to insert into the underground conduit and navigate dips and bends in the conduit, as well as, wind up and store on the reel 54.

The reel 54 that stores the liner 50 has a base 64 that can be located on at the second end 26 of the support 22 for allowing the reel 54 to rotate relative to the base 64 and dispensing lengths of liner 50 from the reel 54.

Figure 5:
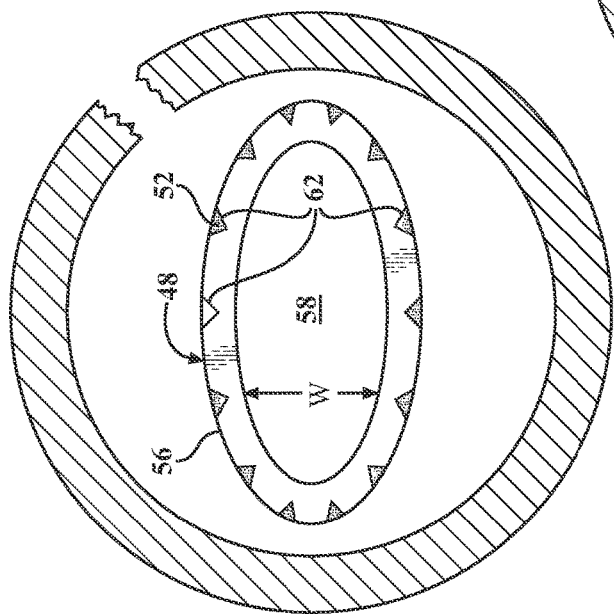
FIG. 5 is a cross sectional view of the first embodiment of the expandable pipe system in a contracted position and disposed in a conduit prior to inflation.
Figure 7:
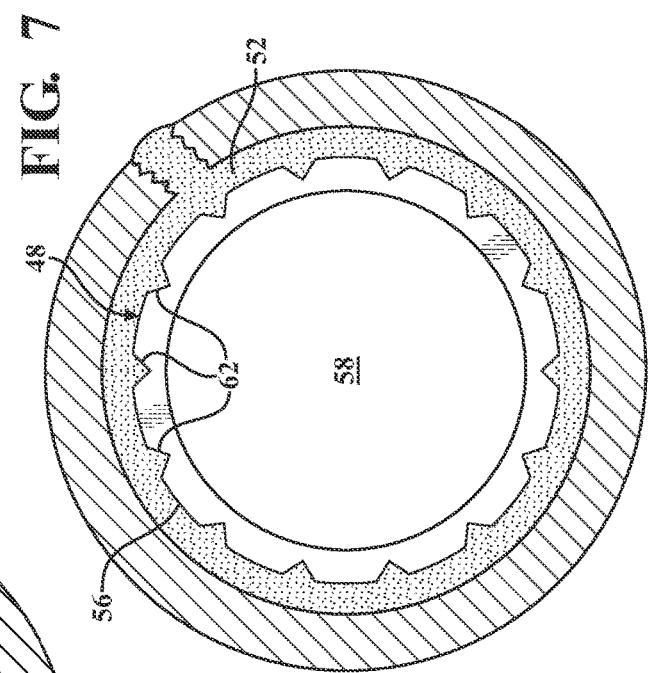
FIG. 7 is a cross sectional view of the expandable pipe system and conduit of FIG. 6 after the curing.
Figure 6:
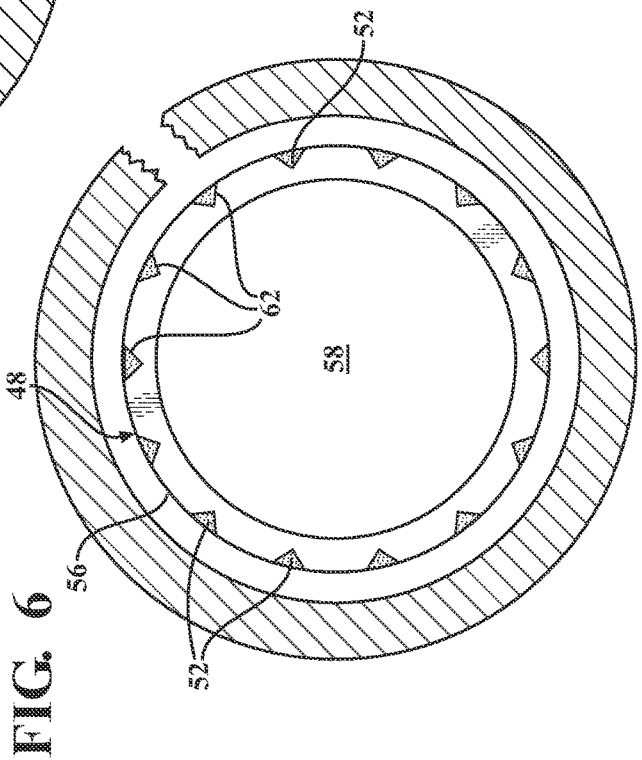
FIG. 6 is a cross sectional view of the fully inflated expandable pipe system and conduit of FIG. 4 along line 6-6.

As the liner 50 unravels from the reel 54 and base 64, the liner 50 and grouting material 52 are routed through the coating process and becomes the expandable pipe system 48. The expandable pipe system 48 is guided down the manhole into the damaged conduit. The expandable pipe system 48 is pulled through by a towline and strung through the conduit attached to a winch mounted at the next manhole. The external diameter of the expandable pipe system 48 is slightly smaller than the internal diameter of the underground conduit and an annular space is formed between the two surfaces of the expandable pipe system 48 and conduit. The grouting material 52 of the expandable pipe system 48 expands and fills in the annular space. Once the full liner length L of the expandable pipe system 48 has been pulled through the conduit, the ends of the expandable pipe system 48 are capped, and as shown in FIGS. 5 and 6, the flattened expandable pipe system 48 is inflated to a specific volume pressure to minimize the annular space. As shown in FIG. 7, the grouting material 52 goes through a curing process where the expandable pipe system 48 adheres to the inner diameter surface of the damaged conduit, filling the holes and cracks of the damaged conduit with the expanding grouting material 52.

As stated above, the expandable pipe system 48 is disposed in a conduit having cracks, voids, holes, or other imperfections due to corrosion, erosion, or other circumstances, as well as, to increase the structural integrity of the conduit. The conduit typically includes a cylindrical shape so that the conduit opening has an annular shape, but the conduit can include other distinct shapes. The conduit can be any type of conduit or pipe. The conduit may be located in the ground, such as a sewage pipe, inside a building, such as a drain pipe, water pipe, or electrical pipe, or under water on a seabed, such as an oil line. The conduit is typically formed of metal, such as copper, aluminum, or iron, or of another material such as concrete, vitrified clay, or asbestos cement. However, the conduit can also be formed of plastic or another material.

The grouting material 52 applied to the liner 50 by the apparatus 20 prior to insertion into the conduit includes urethane, for example, expandable natural urethane grouting material 52. The grouting material 52 can also include other types of urethane grouting material 52, as well as, epoxy grouting material 52, cement-based grouting material 52, and resin-based grouting material 52. The grouting material 52 may include a plurality of fibers such as recycle fiber glass, carbon fiber, coconut fiber, and other recycled or non-recycled fibers for increasing the strength of the grouting material 52. The grouting material 52 can also include a filler material, such as expandable plastic micro-spheres. However, the grouting material 52 can include a variety of other filler materials. The grouting material 52 can be pre-mixed from a variety of different materials and obtain a predetermined strength.

A tank 66 having a top end 68 and a bottom end 70 opposite the top end 68 is installed onto the support 22 between the first end 24 of the support 22 and the reel 54 of liner 50. The grouting material 52 is pre-mixed and loaded into the top end 68 through a covered opening of the tank 66. The grouting material 52 is dispensed at the bottom end 70 of the tank 66.

A variable speed pump 72 is mounted on the support 22 next to the tank 66 and between the first end 24 of the support 22 and the reel 54 of liner 50 and connected to the power supply 28. The pump 72 is a positive displacement pump 72 that delivers measured volume of fluid as required for a given application and has a suction 74 and a discharge 76. The suction 74 of the pump 72 is used for moving the grouting material 52 from the tank 66 to the pump 72. An inlet pipe 78 interconnects the tank 66 and the suction 74 of the pump 72.

The discharge 76 of the pump 72 moves the grouting material 52 into an outlet pipe 80. The outlet pipe 80 directs the flow of the grouting material 52 from the discharge 76 of the pump 72 to a wetout funnel 82.

FIG. 1 shows the wetout funnel 82 mounted onto a supporting framework 84 unloaded from the support 22 by the crane and set on the ground. Once unloaded, the wetout funnel 82 and supporting framework 84 are positioned over top of the manhole. The supporting framework 84 contains a roller-guide 86 that hangs above the wetout funnel 82 for guiding the liner 50 into the wetout funnel 82. Alternatively, the wetout funnel 82 can be mounted to and extend from the second end 26 of the support 22 for positioning over top of the manhole during a conduit repair operation.

Figure 10:
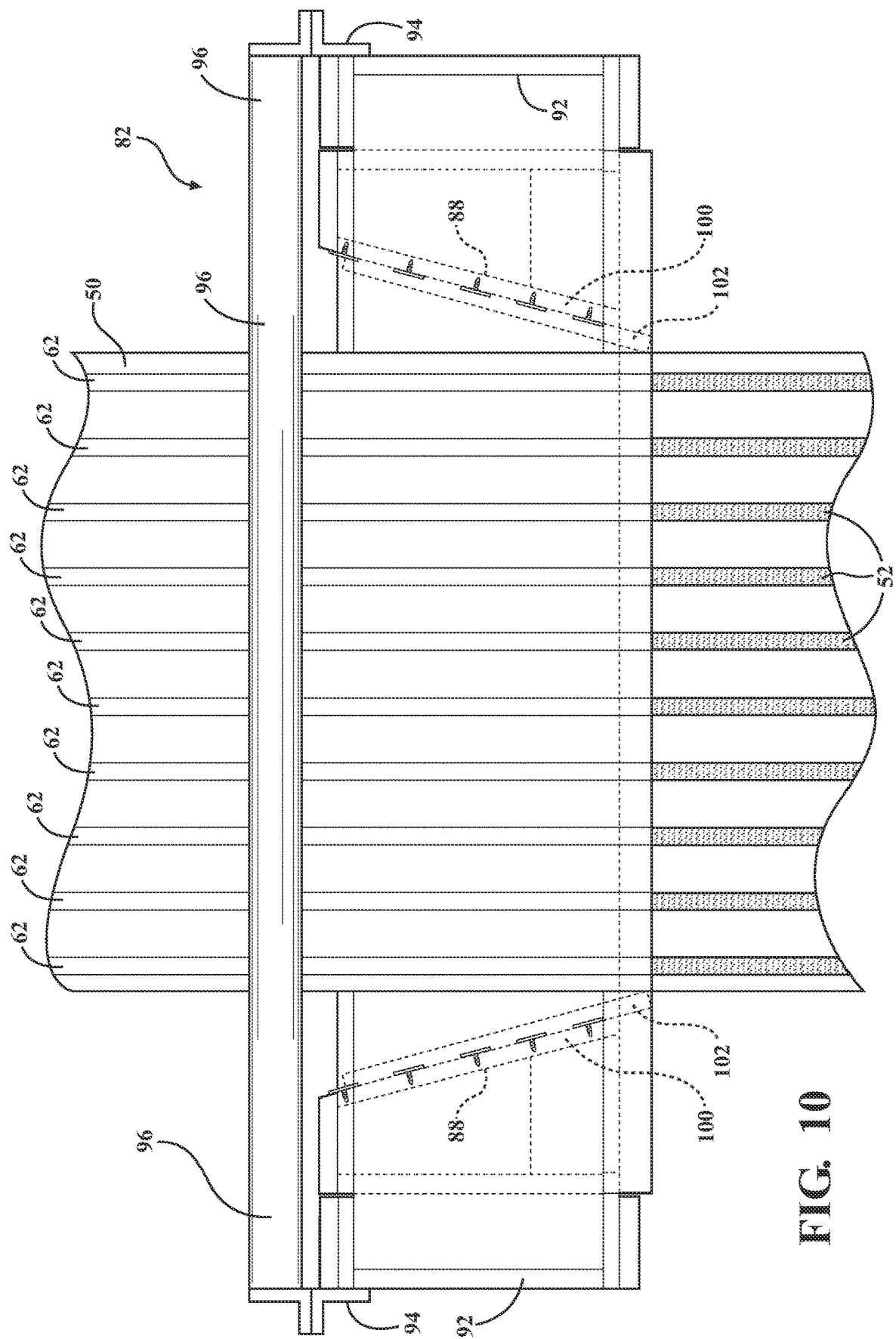
FIG. 10 is a cross sectional view of the side elevational view of the wetout funnel of FIG. 1 along line 10-10.

As shown in FIG. 10, the wetout funnel 82 has opposite walls 88 forming a v-shape angling inwardly from wide at the top and sloping downward narrow at the bottom to form a trough shape with a slot 90. The wetout funnel 82, having the trough shape with a wide mouth to receive the grouting material 52 from the outlet pipe 80 and a narrower stem to channel the grouting material 52, is specifically designed for coating the liner 50 and filling the plurality of grooves 62 in the liner 50 as the liner 50 is pulled through the wetout funnel 82. The wetout funnel 82 has end pieces 92 positionable to accommodate the liner 50 having variable width sizes and thicknesses. Mounted to the side of each end piece 92 is a bracket 94. A first roller 96 and a second roller 98 being disposed in parallel and spaced relationship from one another extend across the wetout funnel 82 and mount to the brackets 94 at each end. The rollers 96, 98 are used for guiding the liner 50 into the wetout funnel 82 from the roller-guide 86 mounted on the supporting framework 84 of the wetout funnel 82.

Figure 11:
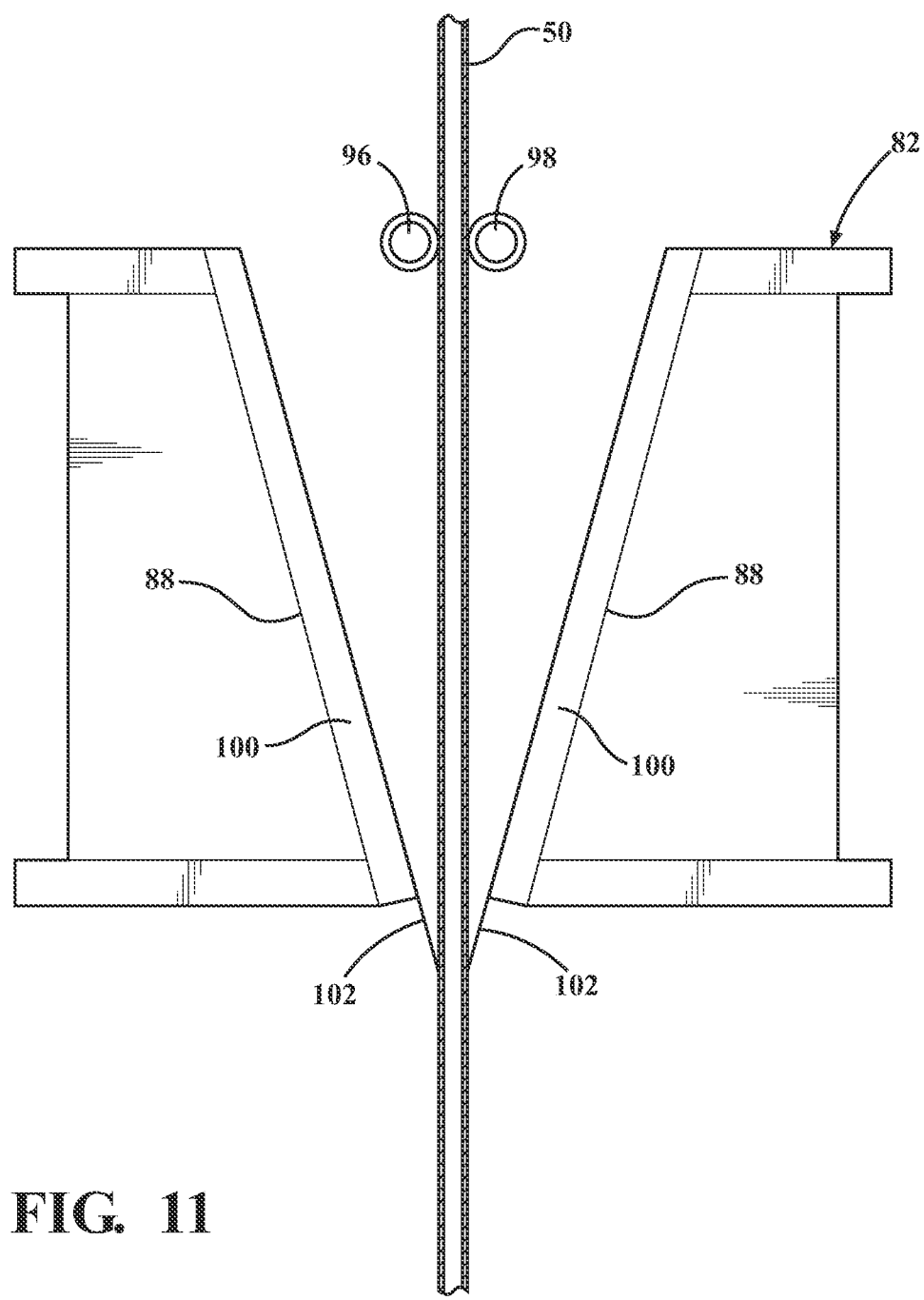
FIG. 11 is a cross sectional view side elevational view of the wetout funnel showing a collapsed liner passing through the alignment rollers and squeegee.

The interior side of the opposite walls 88, angled wide at the top and sloping downward and narrow at the bottom, defining the trough shape, have sheets of organic polymer 100 fastened to them. Alternatively, the sheets of organic polymer 100 can be replaced with a plastic-type coating. Each sheet of organic polymer 100 curls inward to create a seal against the walls 88. The sealing action of the sheets 100 prevent excess grouting material 52 from leaking out the bottom of the wetout funnel 82. FIGS. 10 and 11 show a squeegee 102 attached to each sheet of organic polymer 100. The squeegees 102 are used for controlling the coating of the grouting material 52 and to give a uniform covering on the liner 50 and into the grooves 62 as the liner 50 passes through the wetout funnel 82.

The wetout funnel 82 includes a limit switch 83 (not shown) to control the grouting material 52 level and to ensure complete coverage of the grouting material 52 by winch speed and pump 72 where the pump 72 is programmed to automatically decrease grout delivery on high levels and increase grout delivery at low levels of the grouting material 52.

The grouting material 52 is highly viscous and the size of the inlet pipe 78 and the outlet pipe 80 allows for a uniform flow of the grouting material 52 into the wetout funnel 82. Both the inlet pipe 78 and outlet pipe 80 is of a specified two-inch schedule standard PVC or equivalent. The size of the inlet pipe 78 and outlet pipe 80 must be of sufficient cross-sectional area to deliver a uniform flow of the grouting material 52 onto the liner 50. Working together, the pump 72, pipe system, and the wetout funnel 82 evenly distribute the grouting material 52 on the exterior surface 56 of the liner 50 and smoothing into the grooves 62 prior to insertion into the conduit.

FIG. 1 shows the outlet pipe 80 conveying the grouting material 52 from the pump 72 to the wetout funnel 82 through a first ejector pipe 104 and a second ejector pipe 106. As shown in FIG. 1, the ejector pipes 104, 106 suspend over the wetout funnel 82 in a parallel and spaced relationship with one another and work together to evenly fill the wetout funnel 82 on each side of the liner 50. The first ejector pipe 104 is of a constant diameter having an inflow end 108 and an outflow end 110 for dispensing grouting material 52 into the wetout funnel 82 on one side of the liner 50, and the second ejector pipe 106 is of a constant diameter having an inflow end 108 and an outflow end 110 for dispensing grouting material 52 into the wetout funnel 82 on the opposite side of the liner 50.

Figure 12:
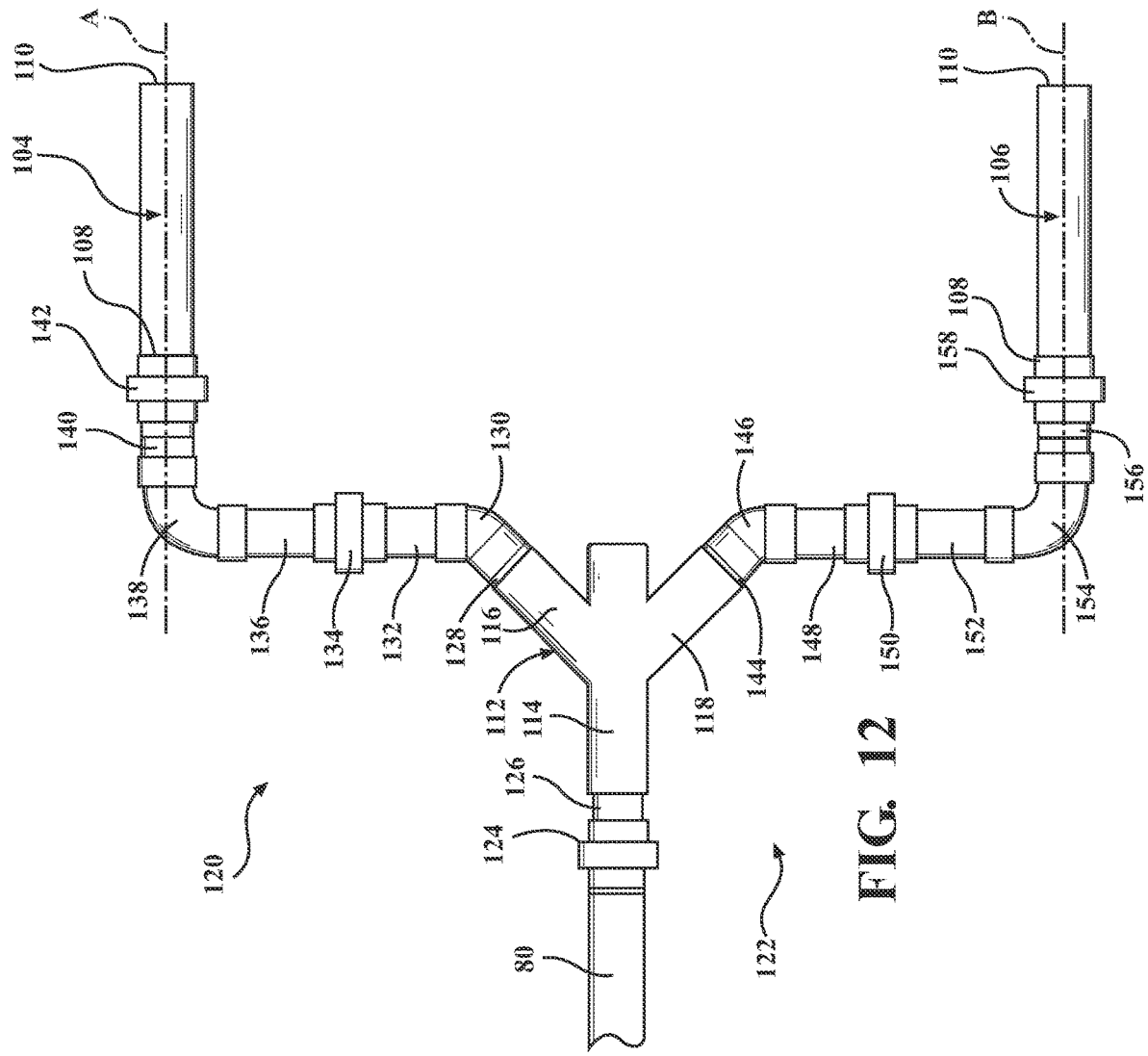
FIG. 12 is a top view of the first conduit and second conduit.

The outlet pipe 80 splits into two branches, shown in FIG. 12, by connecting to a feeder 112 that is defined by an entry leg 114, a first leg 116, and a second leg 118, where the first leg 116 and the second leg 118 are disposed at ninety degrees relative to one another and diverge from the entry leg 114. A first conduit 120 interconnecting the first leg 116 of the feeder 112 to the inflow end 108 of the first ejector pipe 104 conveys grouting material 52 from the feeder 112 to the first ejector pipe 104. A second conduit 122, interconnecting the second leg 118 of the feeder 112 to the inflow end 108 of the second ejector pipe 106, conveys grouting material 52 from the feeder 112 to the second ejector pipe 106. The first conduit 120 and the second conduit 122 suspend over the wetout funnel 82 and work together to evenly coat the liner 50 as it passes between them.

The outlet pipe 80 connects the discharge 76 of the pump 72 to a first union 124. Pipe unions, in general, connect two pipes together in a way that requires only one pipe to be turned when removing the union, facilitating repairs. The first union 124 is defined by having a nut threaded and joining a female section and a male section where both comprise an inner diameter and an outer diameter forming a tubular body portion of uniform diameter. Threads on the outer diameters of the female section and male section receive the nut and allow for disassembly during maintenance and replacement.

A first coupling 126, of the standard type, short length of pipe, is utilized as an adapter to join two pipes. In general, a coupling fitting is used to extend the run of a pipe, or change pipe sizes. The first coupling 126 comprises an inner diameter and an outer diameter forming a tubular body portion of a uniform diameter provided with ends of reduced diameter adapted to telescope into receiving pipe ends. The first coupling 126 receives the end of the first union 124 at one end and the entry leg 114 of the feeder 112 at its opposite end.

Beginning the formation of the first conduit 120, a second coupling 128, utilized as an adapter to join two pipes, comprising an inner diameter and an outer diameter forming a tubular body portion of uniform diameter provided with ends of reduced diameter adapted to telescope into receiving pipe ends, inserts into the first leg 116 at its end.

A first bend 130 is received by the other end of the second coupling 128. The bend comprises an inner diameter and an outer diameter forming a tubular body portion of uniform diameter. Straight sections at each of the ends and a curved section with a radius of forty-five degrees at the middle of the body portion allows for installation between two lengths of pipe and a change of direction in the flow of grouting material 52.

A third coupling 132, utilized as an adapter to join two pipes, comprising an inner diameter and an outer diameter forming a tubular body portion of uniform diameter provided with ends of reduced diameter adapted to telescope into receiving pipe ends, is received by the other end of the first bend 130.

A second union 134 is defined by having a nut threaded and joining a female section and a male section where both comprise an inner diameter and an outer diameter forming a tubular body portion of uniform diameter. Threads on the outer diameters of the female section and male section receive the nut and allow for disassembly during maintenance and replacement. The second union 134 connects to the other end of the third coupling 132.

A fourth coupling 136, of the standard type utilized as an adapter to join two pipes, comprises an inner diameter and an outer diameter forming a tubular body portion of uniform diameter. The fourth coupling 136 has ends of a reduced diameter adapted to telescope into receiving pipe ends and inserts into the end of the second union 134 nearest the first leg 116 of the feeder 112.

A first elbow 138, of the standard type, comprising an inner diameter and an outer diameter. A tubular body portion of uniform diameter is formed having straight sections at each of the ends and a curved section of a radius of ninety degrees at the middle of the body portion. The curved section allows for a change of direction in the flow of grouting material 52. The first elbow 138 receives the other end of the fourth coupling 136.

A fifth coupling 140, of the standard type and utilized as an adapter to join two pipes, comprising an inner diameter and an outer diameter forming a tubular body portion. The tubular body portion is of uniform diameter provided with ends of reduced diameter adapted to telescope into receiving pipe ends. The fifth coupling 140 connects to the first elbow 138 nearest the first leg 116 of the feeder 112.

A third union 142 having a nut threaded joining a female section and a male section where both comprise an inner diameter and an outer diameter forming a tubular body portion of uniform diameter and having threads on said outer diameters of said female section and male section to receive the nut for disassembly. The other end of the fifth coupling 140 connects to the end of a third union 142.

The other end of the third union 142 connects to the inflow end 108 of said first ejector pipe 104. The first ejector pipe 104 is cylindrical in shape and disposed about an Axis A. Grouting material 52 flows out of the outflow end 110 of the first ejector pipe 104.

Beginning the formation of the second conduit 122, a sixth coupling 144, of standard type, comprising an inner diameter and an outer diameter forming a tubular body portion of uniform diameter. The body portion is provided with ends of reduced diameter adapted to telescope into receiving pipe ends. The sixth coupling 144 connects into the second leg 118 at its end.

A second bend 146, comprising an inner diameter and an outer diameter forming a tubular body portion of uniform diameter. The second bend 146 has straight sections at each of its ends and a curved section of a radius of forty-five degrees at the middle of its body portion to allow a change of direction in the flow of grouting material 52. The second bend 146 receives the other end of the sixth coupling 144.

A seventh coupling 148, of standard type, comprising an inner diameter and an outer diameter forming a tubular body portion of uniform diameter. The body portion is provided with ends of reduced diameter adapted to telescope into receiving pipe ends and inserts into the end of the second bend 146.

A fourth union 150, of standard type, is defined by having a nut threaded and joining a female section and a male section where both comprise an inner diameter and an outer diameter forming a tubular body portion of uniform diameter. Threads on the outer diameters of the female section and male section receive the nut and allow for disassembly during maintenance and replacement. The fourth union 150 connects to the other end of the seventh coupling 148.

A eighth coupling 152, of standard type, comprising an inner diameter and an outer diameter forming a tubular body portion of uniform diameter. The eighth coupling 152 is also provided with ends of reduced diameter adapted to telescope into receiving pipe ends of another source and connects to the other end of the fourth union 150.

A second elbow 154, of the standard type, comprising an inner diameter and an outer diameter. A tubular body portion of uniform diameter is formed having straight sections at each of the ends and a curved section of a radius of ninety degrees at the middle of the body portion. The curved section allows for a change of direction in the flow of grouting material 52. The end of the third elbow receives the other end of the eighth coupling 152, A ninth coupling 156, of standard type, comprising an inner diameter and an outer diameter forming a tubular body portion of uniform diameter provided with ends of reduced diameter adapted to telescope into receiving pipe ends, connects to the other end of the third elbow.

A fifth union 158, of standard type, is defined by having a nut threaded and joining a female section and a male section where both comprise an inner diameter and an outer diameter forming a tubular body portion of uniform diameter. Threads on the outer diameters of the female section and male section receive the nut and allow for disassembly during maintenance and replacement. The end nearest the second leg 118 of the feeder 112 of the fifth union 158 connects to the other end of the ninth coupling 156.

A fifth union 158 having a nut threaded joining a female section and a male section where both comprise an inner diameter and an outer diameter forming a tubular body portion of uniform diameter and having threads on said outer diameters of said female section and male section to receive the nut for disassembly. The other end of said ninth coupling 156 connecting to the end of said fifth union 158.

The other end of said fifth union 158 connecting to the inflow end 108 of the second ejector pipe 106. The second ejector pipe 106, cylindrical in shape, disposed about an Axis B, directs the flow of the grouting material through its outflow end 110.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. An apparatus for lining a conduit with grouting material comprising,
    a support extending along an axis between a first end and a second end,
    a power supply and an air compressor mounted on said first end of said support for supplying electrical power and compressed air,
    a crane assembly mounted adjacent said power supply on said support and connected to said power supply for hoisting articles,
    said crane assembly including a mast extending vertically from said support and a boom mounted and cantilevered to said mast and extending from a near end adjacent said mast to a far end,
    said crane assembly including a trolley movably supported by said boom for moving back and forth on said boom and a pulley supported by said trolley and a cable extending along the length of said boom and through said pulley to a hook on the end of the cable for lifting and lowering objects,
    a tank having a top end and a bottom end opposite said top end and installed upon said support between said reel and said second end of said support and for dispensing a grouting material at said bottom end,
    a pump mounted on said support between said tank and said second end of said support and connected to said power supply and having a suction and a discharge,
    an inlet pipe interconnecting said bottom end of said tank and said suction of said pump for moving the grouting material from said tank to said pump,
    an expandable pipe system for insertion into a conduit,
    said expandable pipe system presenting a liner with an exterior surface surrounding a center opening and extending between opposite liner ends,
    said exterior surface presenting a liner width extending across said center opening and a liner length extending along the center opening,
    said liner being formed of a polymer material,
    said exterior surface defining a plurality of grooves spaced from one another and each extending radially into said exterior surface,
    a reel storing said liner in a flattened condition and having a base on said support forward of said tank and of said pump for allowing said reel to rotate relative to said base for dispensing lengths of liner from said reel,
    a supporting framework movable from a stored position on said second end of said support during transport and a working position over a manhole,
    a wetout funnel on said supporting framework for disposition above a manhole,
    said wetout funnel having opposite walls forming a v-shape angling inwardly wide at the top and sloping downward narrow at the bottom to form a trough shape with a slot,
    a limit switch for controlling the level of the grouting material in said wetout funnel,
    a squeegee disposed at said slot for controlling the coating of the grouting material for a uniform covering on said liner as it passes through said wetout funnel,
    sheets of organic polymer fastened to said opposite walls for preventing the grouting material from leaking out of said wetout funnel,
    said wetout funnel having end pieces movable to engage the edges of said liner of different widths,
    a bracket mounted onto each of said end pieces,
    a first roller mounted on top and across of said wetout funnel and attaching to each of said brackets of said end pieces,
    a second roller mounting on top and across of said wetout funnel and attaching to each said brackets of said end pieces,
    said rollers being disposed in parallel and spaced relationship with one another for guiding said liner between said rollers into said wetout funnel, a roller-guide mounted on said supporting framework above said wetout funnel for guiding said liner from said reel and between said rollers and into said wetout funnel for coating said liner before being drawn into the conduit, an outlet pipe interconnecting said discharge of said pump and for conveying said grouting material from said pump, a first ejector pipe of a constant diameter having an inflow end and an outflow end for dispensing grouting material into said wetout funnel on one half of the exterior of said liner, a second ejector pipe of a constant diameter having an inflow end and an outflow end for dispensing grouting material into said wetout funnel on the other half of the exterior of said liner, said ejector pipes being disposed in parallel and spaced relationship with one another for dispensing grouting material into said wetout funnel, a feeder defining an entry leg and a first leg and a second leg disposed at ninety degrees relative to one another and diverging from said entry leg, a first conduit interconnecting said first leg of said feeder to said inflow end of said first ejector pipe for conveying grouting material from said feeder to said first ejector pipe, a second conduit interconnecting said second leg of said feeder to said inflow end of said second ejector pipe for conveying grouting material from said feeder to said second ejector pipe, a first union having a nut threaded joining a female section and a male section where both comprise an inner diameter and an outer diameter forming a tubular body portion of uniform diameter and having threads on said outer diameters of said female section and male section to receive the nut for disassembly, said outlet pipe connecting said discharge of said pump to the end of said first union, a first coupling comprising an inner diameter and an outer diameter forming a tubular body portion of a uniform diameter provided with ends of reduced diameter adapted to telescope into receiving pipe ends, the end of said first coupling receiving the other end of said first union, the opposite end of said first coupling receiving said entry leg of said feeder, a second coupling comprising an inner diameter and an outer diameter forming a tubular body portion of uniform diameter provided with ends of reduced diameter adapted to telescope into receiving pipe ends, the end of said second coupling receiving said first leg, a first bend comprising an inner diameter and an outer diameter forming a tubular body portion of uniform diameter having straight sections at each of the ends and a curved section of a radius of forty-five degrees at the middle of the body portion to allow a change of direction in the flow of grouting material, the other end of said second coupling receiving the end of said first bend, a third coupling comprising an inner diameter and an outer diameter forming a tubular body portion of uniform diameter provided with ends of reduced diameter adapted to telescope into receiving pipe ends, the end of said third coupling receiving the other end of said first bend, a second union having a nut threaded and joining a female section and a male section where both comprise an inner diameter and an outer diameter forming a tubular body portion of uniform diameter and having threads on said outer diameters of said female section and male section to receive the nut for assembly and disassembly, the end of said second union connecting to the other end of said third coupling, a fourth coupling comprising an inner diameter and an outer diameter forming a tubular body portion of uniform diameter provided with ends of reduced diameter adapted to telescope into receiving pipe ends, the end of said fourth coupling inserting into the other end of said second union, a first elbow comprising an inner diameter and an outer diameter forming a tubular body portion of uniform diameter having straight sections at each of the ends and a curved section of a radius of ninety degrees at the middle of the body portion to allow a change of direction in the flow of grouting material, the other end of said fourth coupling receiving the end of said first elbow, a fifth coupling comprising an inner diameter and an outer diameter forming a tubular body portion of uniform diameter provided with ends of reduced diameter adapted to telescope into receiving pipe ends, the other end of said first elbow connecting to the end of said fifth coupling, a third union having a nut threaded joining a female section and a male section where both comprise an inner diameter and an outer diameter forming a tubular body portion of uniform diameter and having threads on said outer diameters of said female section and male section to receive the nut for disassembly, the other end of the fifth coupling connecting to the end of a third union, the other end of said third union connecting to said inflow end of said first ejector pipe, said first ejector pipe cylindrical in shape and disposed about an Axis A, a sixth coupling comprising an inner diameter and an outer diameter forming a tubular body portion of uniform diameter provided with ends of reduced diameter adapted to telescope into receiving pipe ends, the end of said sixth coupling receiving said second leg, a second bend comprising an inner diameter and an outer diameter forming a tubular body portion of uniform diameter having straight sections at each of the ends and a curved section of a radius of forty-five degrees at the middle of said body portion to allow a change of direction in the flow of grouting material, the other end of said sixth coupling receiving the end of said second bend, a seventh coupling comprising an inner diameter and an outer diameter forming a tubular body portion of uniform diameter provided with ends of reduced diameter adapted to telescope into receiving pipe ends, the end of said seventh coupling receiving the other end of said second bend, a fourth union having a nut threaded and joining a female section and a male section where both comprise an inner diameter and an outer diameter forming a tubular body portion of uniform diameter and having threads on the outer diameters of said female section and male section to receive the nut for assembly and disassembly, the end of said fourth union connecting to the other end of said seventh coupling, an eighth coupling comprising an inner diameter and an outer diameter forming a tubular body portion of uniform diameter provided with ends of reduced diameter adapted to telescope into receiving pipe ends of another source, the other end of said fourth union connecting to the end of said eighth coupling, a second elbow comprising an inner diameter and an outer diameter forming a tubular body portion of uniform diameter having straight sections at each of ends and a curved section of a radius of ninety degrees at the middle of said body portion to allow a change of direction in the flow of grouting material, the other end of said eighth coupling receiving the end of said third elbow, a ninth coupling comprising an inner diameter and an outer diameter forming a tubular body portion of uniform diameter provided with ends of reduced diameter adapted to telescope into receiving pipe ends, the other end of said second elbow connecting to the end of said ninth coupling, a fifth union having a nut threaded joining a female section and a male section where both comprise an inner diameter and an outer diameter forming a tubular body portion of uniform diameter and having threads on said outer diameters of said female section and male section to receive the nut for disassembly, the other end of said ninth coupling connecting to the end of said fifth union, the other end of said fifth union connecting to said inflow end of said second ejector pipe, said second ejector pipe cylindrical in shape and disposed about an Axis B.

\* \* \* \* \*